United States Patent
Chu et al.

(10) Patent No.: US 11,695,671 B2
(45) Date of Patent: Jul. 4, 2023

(54) METHOD OF CHECKING CONNECTION INTEGRITY OF SOURCE NODES IN CLUSTER, ELECTRONIC DEVICE, AND COMPUTER READABLE STORAGE MEDIUM APPLYING METHOD

(71) Applicant: Fulian Precision Electronics (Tianjin) Co., LTD., Tianjin (CN)

(72) Inventors: Yu-Sheng Chu, Taipei (TW); Ming-Chu Hsieh, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/708,149

(22) Filed: Mar. 30, 2022

(65) Prior Publication Data

US 2023/0125389 A1    Apr. 27, 2023

(30) Foreign Application Priority Data

Oct. 25, 2021   (CN) .......................... 202111239680.9

(51) Int. Cl.
*H04L 43/0811* (2022.01)
*H04L 43/065* (2022.01)

(52) U.S. Cl.
CPC ........ *H04L 43/0811* (2013.01); *H04L 43/065* (2013.01)

(58) Field of Classification Search
None
See application file for complete search history.

(56) References Cited

U.S. PATENT DOCUMENTS

| | | | | |
|---|---|---|---|---|
| 9,043,274 | B1* | 5/2015 | Cheng | H04L 43/106 707/613 |
| 2012/0084264 | A1* | 4/2012 | Henderson | H04L 67/06 707/672 |
| 2012/0215876 | A1* | 8/2012 | Ohtake | H04L 41/0893 709/208 |
| 2017/0230333 | A1* | 8/2017 | Glazemakers | H04L 63/029 |
| 2018/0367371 | A1 | 12/2018 | Nagarajan et al. | |
| 2020/0073768 | A1 | 3/2020 | Jolad et al. | |
| 2020/0348994 | A1* | 11/2020 | Kao | G06N 3/04 |

FOREIGN PATENT DOCUMENTS

| | | | | |
|---|---|---|---|---|
| CN | 107562511 | * | 1/2018 | |
| CN | 108183914 A | * | 6/2018 | H04L 63/0838 |
| CN | 109525645 A | * | 3/2019 | |
| JP | WO2016117302 A1 | * | 10/2017 | |
| JP | WO2016117302 A1 | * | 10/2017 | |

* cited by examiner

*Primary Examiner* — Younes Naji
(74) *Attorney, Agent, or Firm* — ScienBiziP, P.C.

(57) ABSTRACT

A method of checking connection states of source nodes in a cluster is carried out by host computer, collecting information of a source node of each monitored computer, and generating a checking list. Each source corresponds to a plurality of network interface, and each network interface corresponds to a plurality of target nodes. At least one source node is selected as a to-be-checked source node. Each to-be-checked source node confirms the corresponding target nodes based on an instruction to detect network. Connection states between each to-be-checked source node and the target nodes are detected. A reason for detection failure is confirmed based on the result of detection and the checking list. An electronic device and a computer readable storage medium applying the method are also disclosed.

17 Claims, 4 Drawing Sheets

METHOD OF CHECKING CONNECTION INTEGRITY OF SOURCE NODES IN CLUSTER, ELECTRONIC DEVICE, AND COMPUTER READABLE STORAGE MEDIUM APPLYING METHOD

FIELD

The subject matter herein generally relates to computer monitoring.

BACKGROUND

While managing nodes of a cluster, two nodes need to be connected for ensuring a normal operation of an application corresponding to the node. While checking the connection between the nodes, a monitor host computer generates a plurality of checking instructions to the nodes of monitored computers, which causes a plurality of programs to be loaded and executed at the monitored computers. The resources of the monitored computers are occupied, which affects normal operations of the monitored computer. Further, a checking list is manually established. Due to a larger number of source nodes, an efficiency of establishing the checking list is low and a time is wasted. When a node is disconnected from other nodes, it is hard to find the failed node.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
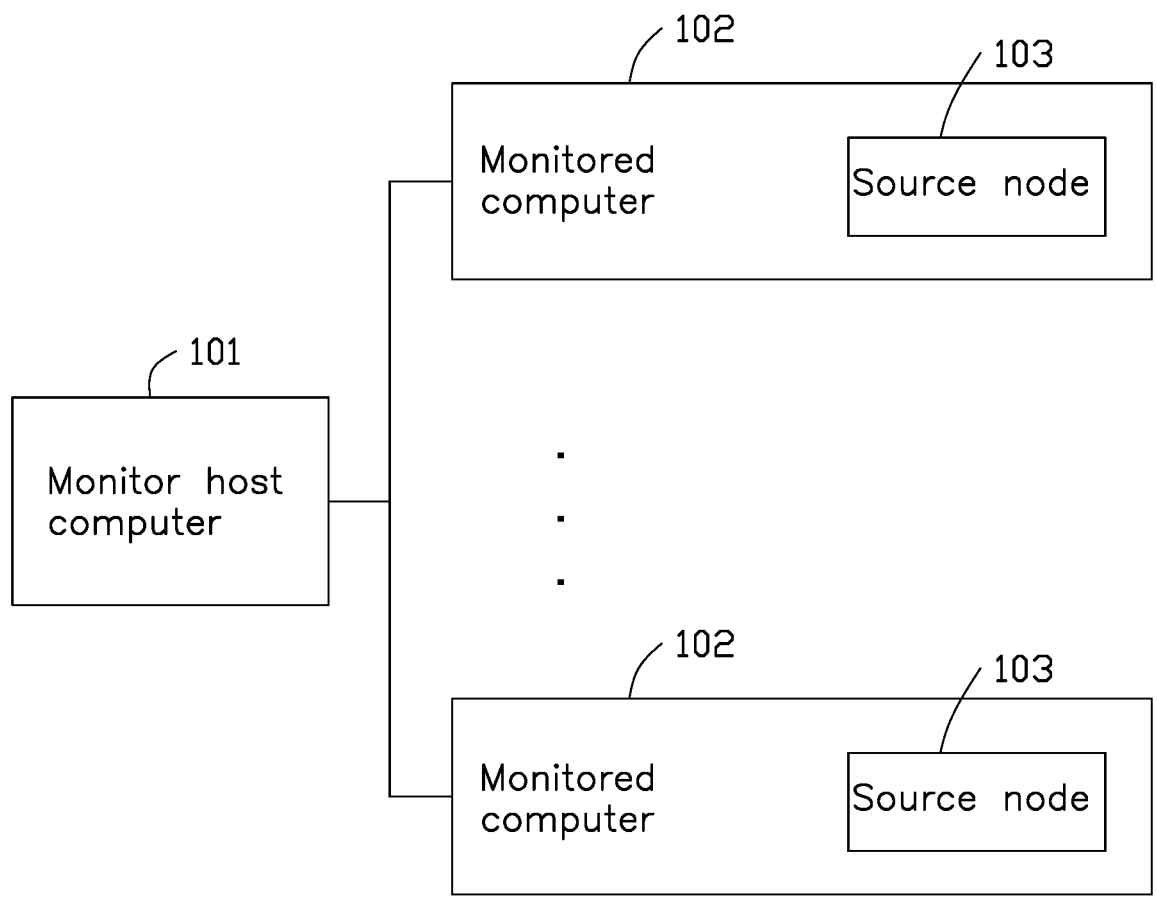
FIG. 1 is a diagram illustrating an embodiment of a monitor host computer connected with a plurality of monitored computers according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The terms of "first" and "second" are for the purpose of describing only and should not be constructed to indicate or imply the relative importance. In the present disclosure, the term "some" means two or more than two, unless otherwise expressly stated.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

FIG. 1 shows a monitor host computer 101. The monitor host computer 101 communicates with a plurality of monitored computers 102. Each monitored computer 102 includes a source node 103.

The monitor host computer 101 controls each monitored computer 102. The monitored computer 102 provides an internet protocol (IP) address to the source node 103. In one embodiment, the IP address of the monitored computer 102 serves as the IP address of the source node 103.

In one embodiment, each monitored computer 102 includes one source node 103, and each source node 103 corresponds to one monitored computer 102.

Figure 2:
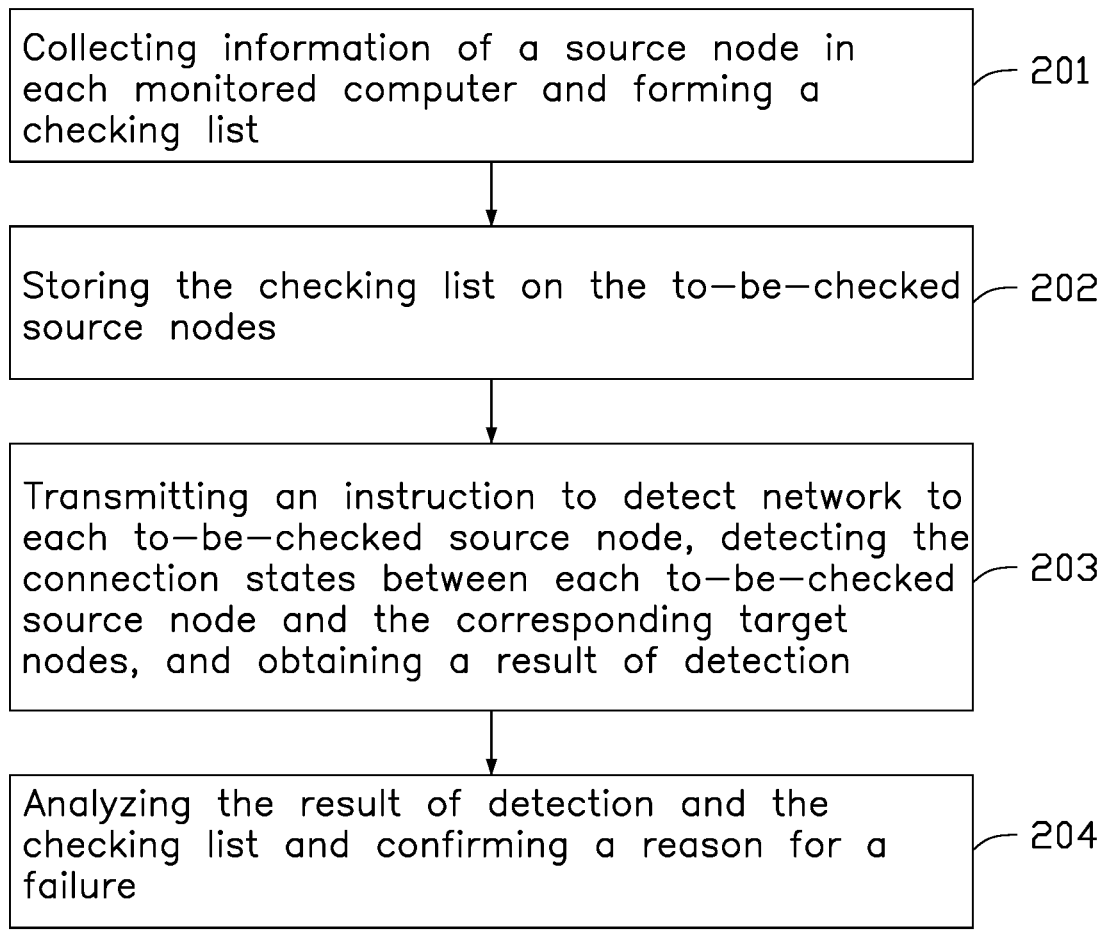
FIG. 2 is a flowchart illustrating an embodiment of a method of checking connection integrity of nodes in a cluster according to the present disclosure.

FIG. 2 shows a flowchart of a method of checking connection integrity of nodes in a cluster. The method includes the following steps and these steps may be re-ordered.

In block 201, information of the source node 103 in each monitored computer 102 is collected by the monitor host computer 101 and a checking list is formed based on the collected information.

In one embodiment, the monitor host computer 101 collects the IP address of each monitored computer 102, which serves as the IP address of the source node 103 in each monitored computer 102. Each monitored computer 102 is managed by the monitor host computer 101. The monitor host computer 101 collects information of network of each source node 103 based on the corresponding IP address of the monitored computer 102 and generates the original checking list. The checking list includes the source node 103 of each monitored computer 102, and a plurality of network interfaces of each source node 103, and a plurality of target nodes. Each network interface corresponds to at least one target node. For example, when the IP address of a first monitored computer 102 is 127.132.128.64, the monitor host computer 101 collects the IP address of the first monitored computer 102. Information as to the network of the source node 103 in the first monitored computer 102 is obtained by addressing the IP address of the first monitored computer 102. The network information includes the network interfaces corresponding to each source node 103 and the IP address of each target node connected with the network interface of each source node 103.

In another embodiment, the source nodes 103 in the checking list are divided into a plurality of groups. Each group includes at least one source node 103. One group represents the source nodes 103 with a same character or function, such as a compute group, a control group, a network group, a storage group, and the like. Each group is further divided into a plurality of sub-groups, such as compute sub-groups 1 to N, network sub-groups 1 to N, and the like. In the groups of the source nodes 103, at least one to-be-checked group is selected through the monitor host computer 101 based on user operations.

In one embodiment, the network interfaces are in the source node 103, and each source node 103 corresponds to a plurality of network interfaces, such as interface 1, interface 2, and the like. At least one to-be-checked network interface is selected as the to-be-checked network interface through the monitor host computer 101 based on the user operations.

In another embodiment, at least one source node 103 is selected from the source nodes 103 in the monitored computer 102 in the checking list as the to-be-checked source node 103. For example, twenty source nodes 103 are selected as the to-be-checked source nodes 103, and the checking list only includes the to-be-checked network interfaces of the to-be-checked source node 103 and the target nodes connected with the to-be-checked network interfaces. Further, the checking list is updated by removing target nodes which are in a turned off state or in a maintenance state. The removed target nodes will be added back into the checking list again when switching into an online state. The to-be-checked source nodes 103 are selected based on the group or the IP addresses of the source node 103.

In block 202, the checking list is stored in the to-be-checked source nodes 103.

In one embodiment, the monitor host computer 101 stores the checking list on the to-be-checked source nodes 103 through an Rsync tool in an asynchronous mode. The Rsync tool can synchronously update files and directories in two computers (such as the monitor host computer 101 and the monitored computer 102), the amount of data to be transferred is reduced by use of a differential coding manner. The source node 103 is stored in the monitored computer 102, and the checking list in the monitor host computer 101 can be synchronously updated into the to-be-checked source nodes 103 in monitored computers 102.

In block 203, an instruction to detect network is transmitted to each to-be-checked source node 103, and connections states between each to-be-checked source node 103 and the corresponding target nodes are detected based on the instruction to detect network, and a result of detection is obtained.

In one embodiment, the monitor host computer 101 confirms at least one target node corresponding to the to-be-checked source node 103 based on the checking list and acquires the content of the checking list based on the instruction to detect network. The connection state between each to-be-checked source node 103 and the corresponding target node is detected in the asynchronous manner, thus the result of detection is obtained. An example of the result of detection in a JSON format is shown as below.

{"name1[\<target node 1 IP>\"],\"<network interface 1>"\ : "<detection result>",
"name1 [<target node 2 IP>\"],\"<network interface 2>"\ : "<detection result>"
. . .
"name1[\<target node n IP>\"],\"<network interface n>"\ : "<detection result>"
}

In block 204, the result of detection and the checking list are analyzed and a reason for a failure is confirmed.

When the connection states between each to-be-checked source node 103 and the corresponding target nodes through a first network interface are connection failure and the connection states of each to-be-checked source node 103 and the corresponding target nodes through a second network interface are good connection, an error exists in the first network interface.

Tables 1-6 below show the different results of detection including the connection states between each to-be-checked source node 103 and the corresponding target nodes.

TABLE 1

| Interface 1 | Compute 1 | Compute 2 | Network | Storage |
| --- | --- | --- | --- | --- |
| Target node 1 | N | N | Y | Y |
| Target node 2 | N | N | Y | Y |
| Target node 3 | N | N | Y | Y |
| Target node 4 | N | N | Y | Y |

TABLE 2

| Interface 2 | Compute 1 | Compute 2 | Network | Storage |
| --- | --- | --- | --- | --- |
| Target node 1 | Y | Y | Y | Y |
| Target node 2 | Y | Y | Y | Y |
| Target node 3 | Y | Y | Y | Y |
| Target node 4 | Y | Y | Y | Y |

TABLE 3

| Interface 1 | Compute 1 | Compute 2 | Network | Storage |
| --- | --- | --- | --- | --- |
| Target node 1 | N | N | N | N |
| Target node 2 | N | Y | Y | Y |
| Target node 3 | N | Y | Y | Y |
| Target node 4 | N | Y | Y | Y |

TABLE 4

| Interface 2 | Compute 1 | Compute 2 | Network | Storage |
| --- | --- | --- | --- | --- |
| Target node 1 | Y | Y | Y | Y |
| Target node 2 | Y | Y | Y | Y |
| Target node 3 | Y | Y | Y | Y |
| Target node 4 | Y | Y | Y | Y |

TABLE 5

| Interface 1 | Compute | Control | Network | Storage |
| --- | --- | --- | --- | --- |
| Target node 1 | N | N | N | N |
| Target node 2 | N | N | N | N |
| Target node 3 | N | N | N | N |
| Target node 4 | N | N | N | N |

TABLE 6

| Interface 2 | Compute | Control | Network | Storage |
| --- | --- | --- | --- | --- |
| Target node 1 | Y | Y | Y | Y |
| Target node 2 | Y | Y | Y | Y |

TABLE 6-continued

| Interface 2 | Compute | Control | Network | Storage |
|---|---|---|---|---|
| Target node 3 | Y | Y | Y | Y |
| Target node 4 | Y | Y | Y | Y |

N represents a connection failure between the to-be-checked source node 103 and the corresponding target nodes, and Y represents a good connection state between the to-be-checked source node 103 and the corresponding target nodes. Interface represents the network interface.

As shown in Table 1, the connection states between one to-be-checked node 103 in the network interface 1 and all the corresponding target nodes in the compute sub-group 1 show connection failure. As shown in Table 2, the connection states between the to-be-checked node 103 in the network interface 2 and all the corresponding target nodes in the compute sub-group 1 show good connection. Thus, an error exists in the network interface 1 of the to-be-checked source nodes 103 corresponding to the compute group 1.

As shown in Table 2, the connection states between one to-be-checked node 103 in the network interface 1 and all the corresponding target nodes in the compute sub-group 1 in the compute sub-group 1 show connection failure, the connection states between the to-be-checked node 103 in network interface 1 and the target nodes in other groups also show connection failure. As shown in Table 4, the connection states between the to-be-checked node 103 in network interface 2 and all the corresponding target nodes in the compute sub-group 1 in the compute group are good connections. Thus, an error exists in network interface 1 of the to-be-checked source node 103 corresponding to the compute sub-group 1.

As shown in Table 5, the connection states between one to-be-checked node 103 in the network interface 1 and all the corresponding target nodes in the compute group, the control group, the network group, and the storage group show connection failure. As shown in Table 6, the connection states between the to-be-checked node 103 in network interface 2 and all the corresponding target nodes in the compute group, the control group, the network group, and the storage group show good connection. Thus, errors exist in the compute group, the control group, the network group, and the storage group of the network interface 1.

Figure 3:
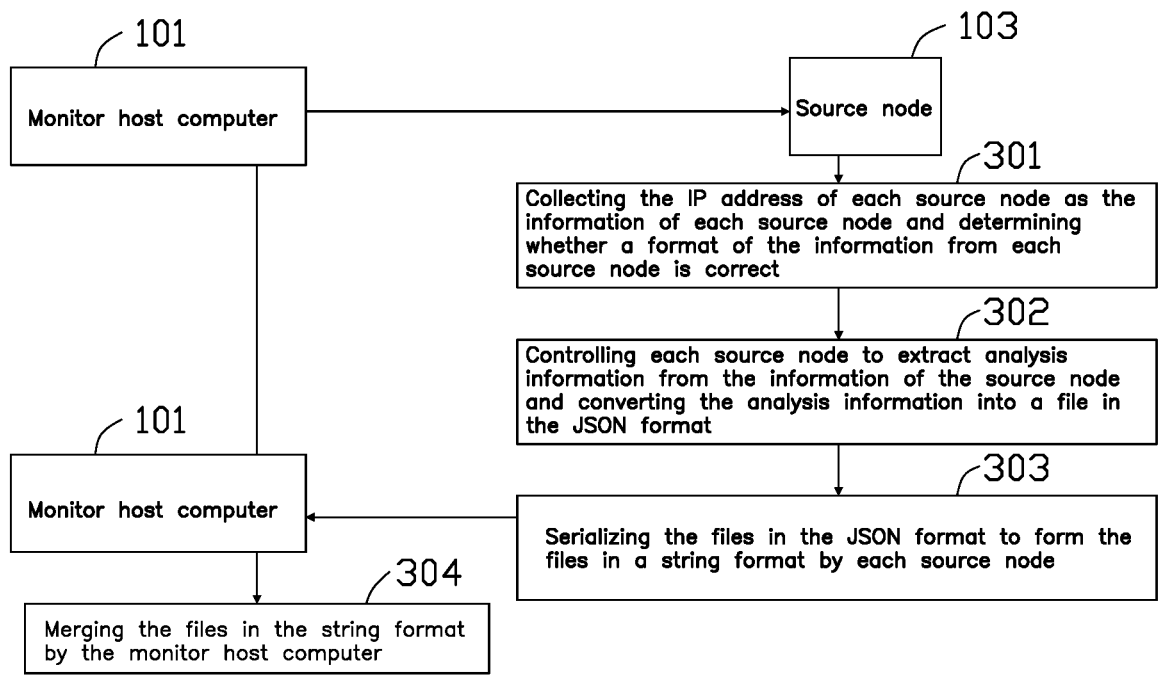
FIG. 3 is a detailed flowchart illustrating an embodiment of block 201 in the method in FIG. 2 according to the present disclosure.
Figure 4:
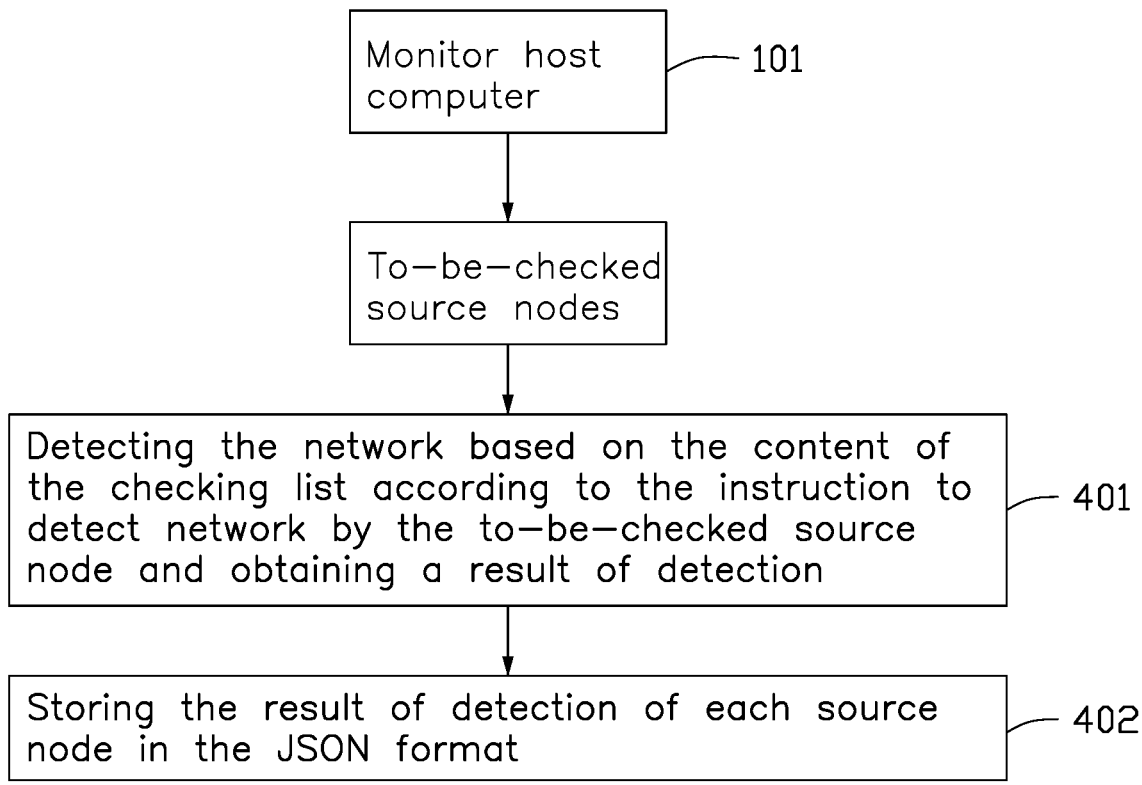
FIG. 4 is a detailed flowchart illustrating an embodiment of the block 203 in the method in FIG. 2 according to the present disclosure.

FIG. 3 shows a detail flowchart of block 201.

In one embodiment, the monitor host computer 101 generates a collect instruction to each source node 103 through a Secure Shell (SSH) protocol for collecting information. The SSH is an encrypted network transmission protocol for providing a safe transmission environment. The SSH establishes a safety tunnel in the network for connecting a SSH client with a server. The SSH protocol is used for transmitting command-line interface instructions and remote execution instructions. By the SSH protocol, the monitor host computer 101 can stably transmit the collect instruction to each source node 103.

In block 301, the IP address of each source node 103 is collected as the information of each source node 103, and determining whether a format of the information from each source node 103 is correct.

In one embodiment, the IP address of each monitored computer 102 with the source node 103 is collected as the information of each source node 103. A CollectVlanIPTable script is used for collecting the information of the source node 103. The CollectVlanIPTable script also can be used for determining the format of the information of the source node 103 and generating a file in a JSON format. An example of the information of the source node 103 being in a correct format is shown as below.

127.xxx.xxx.x/xx dev <interface name> proto kernel scope link src <ip>

127.xxx.xxx.x/xx represents the IP address of the source node 103, and interface name represents the internet interface.

In block 302, the monitor host computer 101 controls each source node 103 to extract analysis information from the information of the source node 103 and converts the analysis information into the file in the JSON format.

In one embodiment, when the format of the information of the source node 103 is wrong, the monitor host computer 101 considers the information of the source node 103 to be invalid. When the format of the information of the source node 103 is correct, the monitor host computer 101 controls the source node 103 to extract the analysis information. The analysis information includes the network interfaces of each source node 103 and the IP address of each target node connected with the network interfaces of each source node 103.

An example of the file in the JSON format is shown as below.

{"interface": "<interface 1>", "ip":"<172.168.64.32> "}

In block 303, the files in the JSON format are serialized to form files in a string format by each source node 103.

The monitor host computer 101 receives the file in the string format from each source node 103.

In block 304, the monitor host computer 101 merges the files in the string format.

FIG. shows a detailed flowchart of block 203.

In block 401, the to-be-checked source node 103 detects the network based on the content of the checking list according to the instruction to detect network and the result of detection is obtained.

The monitor host computer 101 generates to the to-be-checked source nodes 103 the instruction to detect network.

In one embodiment, the to-be-checked source node 103 obtains the content of the checking list according to the instruction to detect network, and the connection state between each to-be-checked source node 103 and the corresponding target nodes are detected in the asynchronous manner.

In block 402, the result of detection of each source node 103 is stored in the JSON format.

The monitor host computer 101 receives the result of detection in the JSON format.

Figure 5:
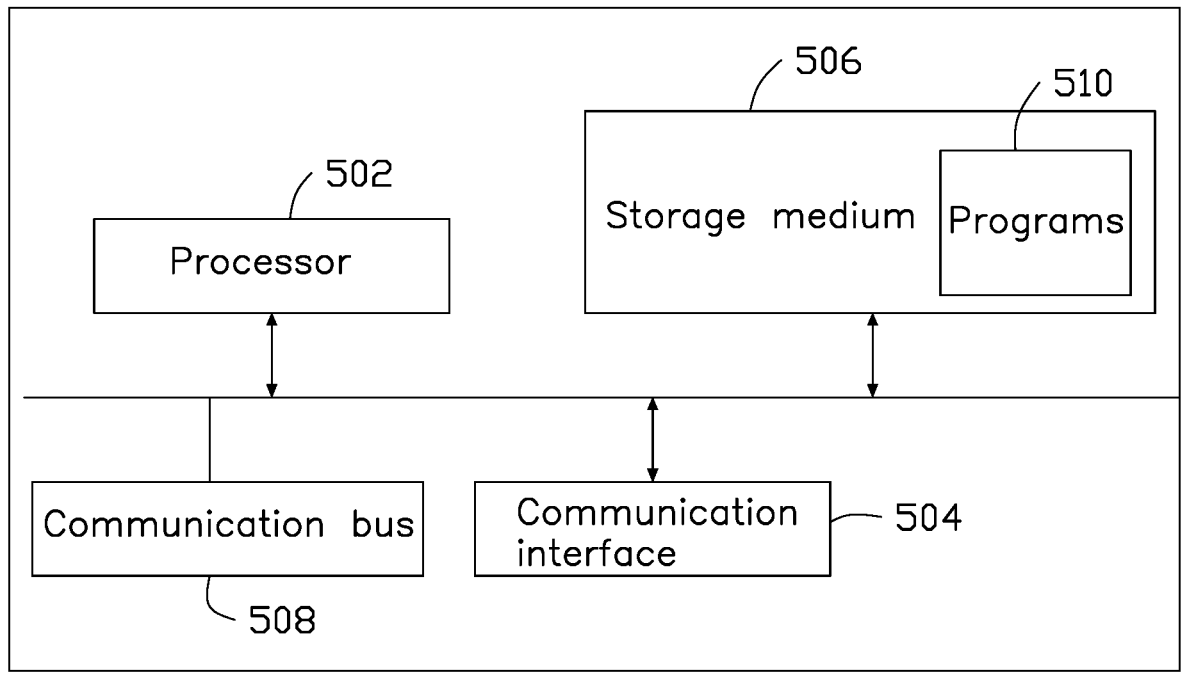
FIG. 5 is a diagram illustrating an embodiment of an electronic device according to the present disclosure.

FIG. 5 shows an electronic device. The electronic device can include a processor 502, a communication interface 504, a storage medium 506, and a communication bus 508.

The processor 502, the communication interface 504, and the storage medium 506 communicate with each other through the communication bus 508.

The communication interface 504 is used for communicating with network elements of other devices such as other terminals or servers.

The processor 502 is configured to execute programs 510, particularly to execute steps in the method of checking a connection state of nodes in a cluster of the electronic device in the above embodiments.

The programs 510 can include program codes. The program codes include computer operation instructions.

The processor 502 can be a central processing unit (CPU), an application-specific integrated circuit (ASIC), or may be one or more integrated circuits configured to implement this embodiment of the present invention. One or more processors included in the electronic device may be processors of a same type, such as one or more CPUs; or may be processors of different types, such as one or more CPUs and one or more ASICs.

The storage medium 506 stores programs 510. The storage 506 can include a high-speed random access memory (RAM) memory, and may further include a non-volatile memory, for example, at least one magnetic disk memory.

The programs 510 instruct the processor 502 to implement some operations of the method in the above embodiments.

The algorithms and displays presented herein are not inherently associated with any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for enablement and preferred mode of the present invention.

A large number of specific details are described in the specification provided herein. However, it can be understood that the embodiments of the disclosure can be practiced without these specific details. In some examples, well-known methods, structures, and techniques have not been shown in detail so as not to obscure the understanding of this specification.

Moreover, a person skilled in the art will understand that although some embodiments stated herein comprise certain features rather than other features included in other embodiments, there can be a combination of features of different embodiments within the scope of the disclosure and forming different embodiments. For example, in the following claims, any one of the claimed embodiments can be used in any combination.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The term "include" does not exclude the existence of elements or steps which are not listed in the claims. The usage of the term "compute", "compute", or "control" do not present specific meanings. These words are to be interpreted as descriptive names only.

What is claimed is:

1. A method of checking connection states of source nodes in monitored computers used in a monitor host computer;
the monitor host computer comprises a storage medium with programs and a processor; the processor executes the programs in the storage medium to implement the following steps:
collecting information of a respective source node of each monitored computer and generating a checking list;
the checking list comprises the respective source node of each monitored computer, a plurality of network interfaces of the respective source node, and a plurality of target nodes; each network interface corresponds to a plurality of target nodes;
selecting the respective source node as to-be-checked source node;
transmitting an instruction to detect network to said to-be-checked source node, and controlling said to-be-checked source node to confirm corresponding target nodes;
detecting connection states between said to-be-checked source node and the corresponding target nodes and obtaining a result of detection; and
receiving the result of detection of the respective source node and confirming a reason for a failure based on the result of detection and the checking list,
wherein the step of collecting information of the respective source node of each monitored computer comprises:
collecting a respective internet protocol (IP) address of each monitored computer corresponding to the respective source node;
collecting the information of the respective source node based on the respective IP address; the information of the respective source node comprises the plurality of network interfaces of the respective source node and IP address of a corresponding target node connected with each network interface; and
generating the checking list based on the information of the respective source node;
wherein the monitor host computer generates a collect instruction to the respective source node through a Secure Shell (SSH) protocol for collecting self-information;
the step of collecting the information of the respective source node based on the respective IP address comprises:
collecting the respective IP address of the respective source node as the information of the respective source node by a CollectVlanIPTable script,
determining, by the CollectVlanIPTable script, whether a format of the information of the respective source node is correct; and
in response to determining that the format of the information of the respective source node is correct, controlling the respective source node to extract analysis information from the information of the respective source node and converting the analysis information into a JavaScript Object Notation (JSON) format file; the analysis information comprises the plurality of network interfaces of the respective source node and the IP address of the corresponding target node connected with each network interface.

2. The method of claim 1, wherein the method further comprises:
dividing source nodes in the checking list into a plurality of groups;
selecting at least one group as to-be-checked group;
confirming to-be-checked network interfaces corresponding to each source node in the to-be-checked group, and confirming target nodes connected with the to-be-checked network interfaces; and
storing the checking list in said to-be-checked source node.

3. The method of claim 1, wherein the step of collecting the information of the respective source node based on the respective IP address further comprises:
serializing the JSON format file in a correct format to form a string format file by the respective source node;
receiving the string format file from the respective source node; and merging the string format file with other string format files to form the checking list.

4. The method of claim 2, wherein the checking list is stored in to-be-checked source nodes through a Rsync tool.

5. The method of claim 2, wherein the checking list is stored in said to-be-checked source node in an asynchronous mode.

6. The method of claim 1, wherein the step of detecting the connection states between said to-be-checked source node and the corresponding target nodes and obtaining the result of detection comprises:
obtaining content of the checking list according to the instruction to detect network, detecting the connection states between said to-be-checked source node and the corresponding target nodes in an asynchronous manner, and obtaining the result of detection; the result of said to-be-checked source node is stored in a JSON format; and receiving the result of detection of the respective source node in the JSON format by the monitor host computer.

7. The method of claim 1, wherein when connection states between said to-be-checked source node and the corresponding target nodes through a first network interface show connection failure, and connection states between said to-be-checked source node and the corresponding target nodes through a second network interface show good connection, an error occurs in the first network interface of said to-be-checked source node.

8. An electronic device comprises:
a storage medium with programs; and a processor; the processor executes the programs in the storage medium to implement the following steps:
collecting information of a respective source node of each monitored computer and generating a checking list by a monitor host computer;
the checking list comprises the respective source node of each monitored computer, a plurality of network interface of the respective source node, and a plurality of target nodes; each network interface corresponds to a plurality of target nodes;
selecting the respective source node as to-be-checked source node;
transmitting an instruction to detect network to said to-be-checked source node, and
controlling said to-be-checked source node to confirm corresponding target nodes;
detecting connection states between said to-be-checked source node and the corresponding target nodes and obtaining a result of detection; and
receiving the result of detection of the respective source node and confirming a reason for a failure based on the result of detection and the checking list;
collecting a respective internet protocol (IP) address of each monitored computer corresponding to the respective source node;
collecting the information of the respective source node based on the respective IP address;
the information of the respective source node comprises the plurality of network interfaces of the respective source node and IP address of a corresponding target node connected with each network interface; and
generating the checking list based on the information of the respective source node wherein the monitor host computer generates a collect instruction to the respective source node through a Secure Shell (SSH) protocol for collecting self-information;
the processor further:
collecting the respective IP address of the respective source node as the information of the respective source node by a CollectVlanIPTable script,
determining, by the CollectVlanIPTable script, whether a format of the information of the respective source node is correct; and
in response to determining that the format of the information of the respective source node is correct,
controlling the respective source node to extract analysis information from the information of the respective source node and converting the analysis information into a JavaScript Object Notation (JSON) format file; the analysis information comprises the plurality of network interfaces of the respective source node and the IP address of the corresponding target node connected with each network interface.

9. The electronic device of claim 8, wherein the processor further:
dividing source nodes in the checking list into a plurality of groups;
selecting at least one group as to-be-checked group;
confirming to-be-checked network interfaces corresponding to each source node in the to-be-checked group, and confirming target nodes connected with the to-be-checked network interfaces; and
storing the checking list in said to-be-checked source node.

10. The electronic device of claim 8, wherein the processor further:
serializing the JSON format file in a correct format to form a string format file by the respective source node;
receiving the string format file from the respective source node; and
merging the string format file with other string format files to form the checking list.

11. The electronic device of claim 9, wherein the checking list is stored in to-be-checked source nodes through a Rsync tool in an asynchronous mode.

12. The electronic device of claim 8, wherein the processor further:
obtaining content of the checking list according to the instruction to detect network, detecting the connection states between said to-be-checked source node and the corresponding target nodes in an asynchronous manner, and
obtaining the result of detection; the result of said to-be-checked source node is stored in a JSON format; and receiving the result of detection of the respective source node in the JSON format by the monitor host computer.

13. The electronic device of claim 8, wherein when connection states between said to-be-checked source node and the corresponding target nodes through a first network interface show connection failure, and connection states between said to-be-checked source node and the corresponding target nodes through a second network interface show are good connection, an error occurs in the first network interface of said to-be-checked source node.

14. A non-transitory computer readable storage medium stores computer programs; the computer programs are executed by at least one processor to implement the following steps:
collecting information of a respective source node of each monitored computer and generating a checking list by a monitor host computer;

the checking list comprises the respective source node of each monitored computer, a plurality of network interface of the respective source node, and a plurality of target nodes;

each network interface corresponds to a plurality of target nodes;

selecting the respective source node as to-be-checked source node;

transmitting an instruction to detect network to said to-be-checked source node, and controlling said to-be-checked source node to confirm corresponding target nodes;

detecting connection states between said to-be-checked source node and the corresponding target nodes and obtaining a result of detection; and receiving the result of detection of the respective source node and confirming a reason for a failure based on the result of detection and the checking list, wherein the step of collecting the information of the respective source node of each monitored computer comprises:

collecting a respective internet protocol (IP) address of each monitored computer corresponding to the respective source node;

collecting the information of the respective source node based on the respective IP address;

the information of the respective source node comprises the plurality of network interfaces of the respective source node and IP address of a corresponding target node connected with each network interface; and generating the checking list based on the information of the respective source node;

wherein the monitor host computer generates a collect instruction to the respective source node through a Secure Shell (SSH) protocol for collecting self-information;

the step of collecting the information of the respective source node based on the respective IP address comprises:

collecting the IP address of the respective source node as the information of the respective source node by a CollectVlanIPTable script, determining, by the CollectVlanIPTable script, whether a format of the information of the respective source node is correct; and in response to determining that the format of the information of the respective source node is correct, controlling the respective source node to extract analysis information from the information of the respective source node and converting the analysis information into a JavaScript Object Notation (JSON) format file; the analysis information comprises the plurality of network interfaces of the respective source node and the IP address of the corresponding target node connected with each network interface.

15. The non-transitory computer readable storage medium of claim 14, wherein the method further comprises:

dividing source nodes in the checking list into a plurality of groups;

selecting at least one group as to-be-checked group;

confirming to-be-checked network interfaces corresponding to each source node in the to-be-checked group, and confirming target nodes connected with the to-be-checked network interfaces; and storing the checking list in said to-be-checked source node.

16. The non-transitory computer readable storage medium of claim 14, wherein the step of collecting the information of the respective source node based on the respective IP address further comprises:

serializing the JSON format file in a correct format to form a string format file by the respective source node;

receiving the string format file from the respective source node; and merging the string format file with other string format files to form the checking list.

17. The non-transitory computer readable storage medium of claim 14, wherein the step of detecting the connection states between said to-be-checked source node and the corresponding target nodes and obtaining the result of detection comprises:

obtaining content of the checking list according to the instruction to detect network, detecting the connection states between said to-be-checked source node and the corresponding target nodes in an asynchronous manner, and obtaining the result of detection; the result of said to-be-checked source node is stored in a JSON format; and receiving the result of detection of the respective source node in the JSON format by the monitor host computer.

* * * * *